United States Patent [19]

Kelly

[11] Patent Number: 4,669,241
[45] Date of Patent: Jun. 2, 1987

[54] THERMAL INSULATED AND SHOCK RESISTANT WINDOW ASSEMBLY

[75] Inventor: Paul R. Kelly, Chillicothe, Ill.

[73] Assignee: Thermatic Glass, Inc., Chillicothe, Ill.

[21] Appl. No.: 823,313

[22] Filed: Jan. 28, 1986

[51] Int. Cl.[4] .............................................. E04B 1/62
[52] U.S. Cl. .................................... 52/400; 52/790; 52/398; 156/107; 156/109
[58] Field of Search ................. 52/397, 398, 399, 400, 52/790; 156/107, 109; 428/34

[56] References Cited

U.S. PATENT DOCUMENTS

| | | | |
|---|---|---|---|
| 3,553,913 | 1/1971 | Eisenberg | 52/790 X |
| 3,791,910 | 2/1974 | Bowser | 52/400 X |
| 3,852,149 | 12/1974 | Sitter et al. | 52/790 |
| 3,872,198 | 3/1975 | Britton | 156/109 X |
| 4,018,022 | 4/1977 | Fink | 52/400 X |
| 4,030,263 | 6/1977 | Lacombe | 52/790 |
| 4,259,135 | 3/1981 | Kulla | 52/399 X |
| 4,259,823 | 4/1981 | Hellriegel | 52/400 |
| 4,295,305 | 10/1981 | Shelver | 52/400 X |

Primary Examiner—Carl D. Friedman
Attorney, Agent, or Firm—Leydig, Voit & Mayer

[57] ABSTRACT

A multi-panel thermal insulated glass unit is supported within an outer frame of U-shaped cross-section by a molded-in-place filler of silicone rubber. The latter forms a resiliently yieldable cushion which supports the glass unit in spaced relation from the frame and which enables limited floating of the glass unit within the frame to isolate the glass unit from shock and vibration imparted to the frame. As a result, the insulated glass unit may be used reliably in a heavy duty off-the-road construction vehicle without any appreciable risk of shock and vibration causing glass breakage or rupture of the airtight seal between the glass panels.

6 Claims, 5 Drawing Figures

U.S. Patent  Jun. 2, 1987  4,669,241
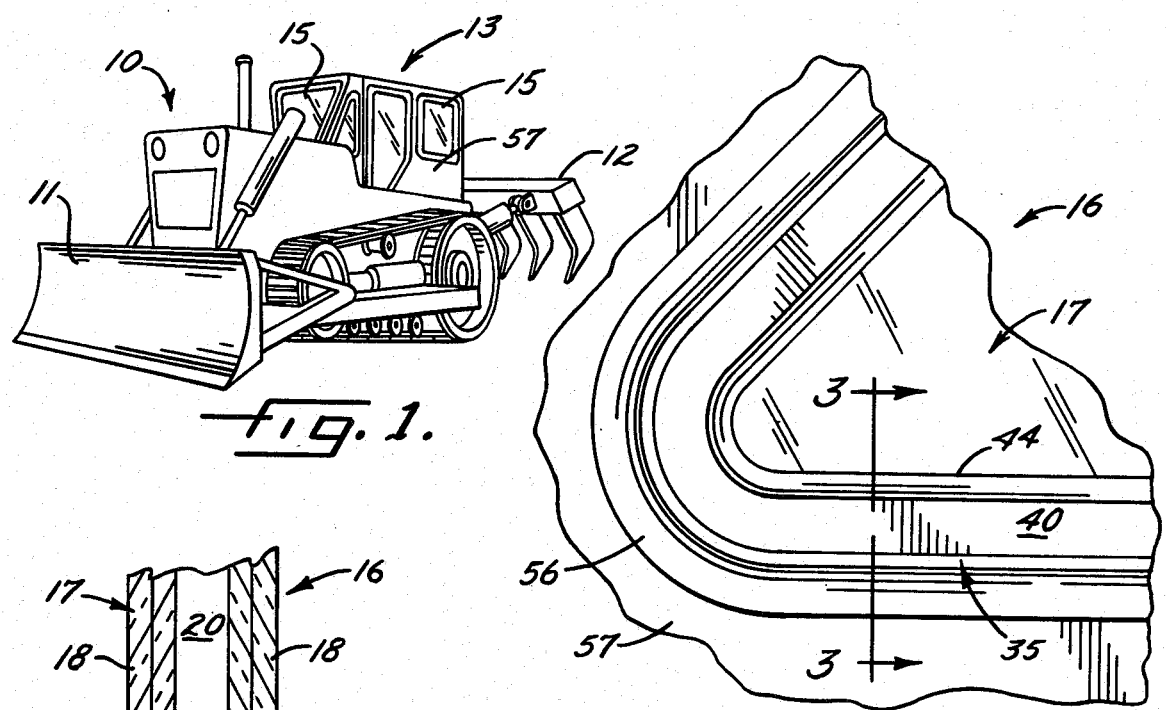
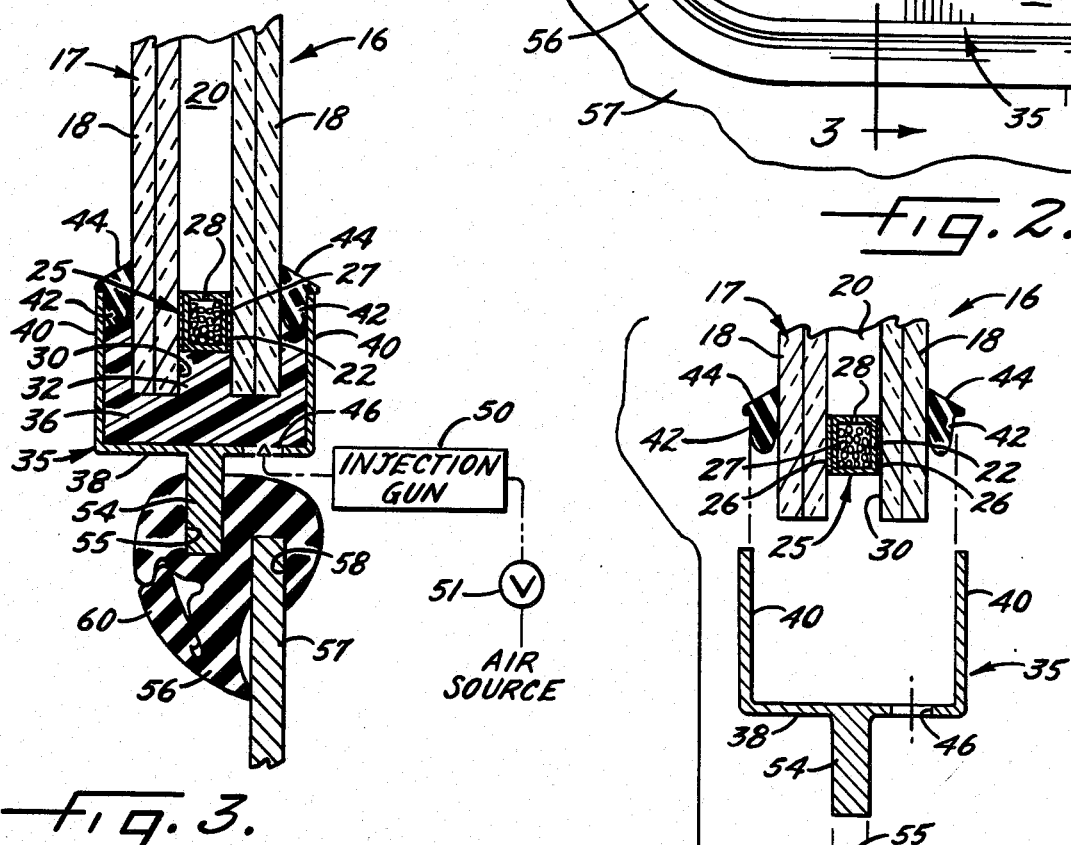
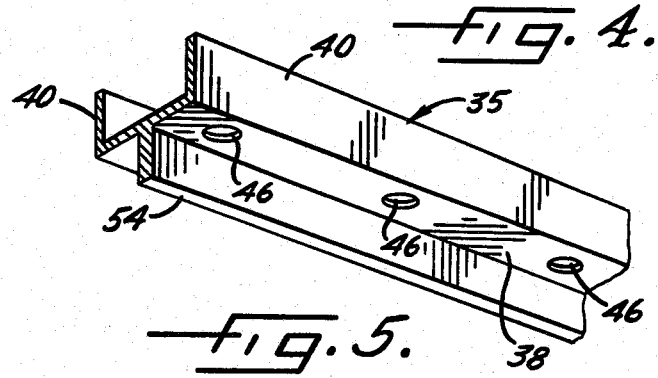

THERMAL INSULATED AND SHOCK RESISTANT WINDOW ASSEMBLY

BACKGROUND OF THE INVENTION

This invention relates generally to a window assembly and, more particularly, to a window assembly which is especially suitable for use in the cab of a rugged off-the-road vehicle of the type used in the construction and agricultural industry. Such vehicles (e.g., crawler-type tractors) are frequently subjected to severe shock loads and vibratory forces during the performance of heavy duty work.

Modern off-the-road construction and agricultural have enclosed cabs which are adapted to be heated and air conditioned to provide comfort for the operator during year around use of the vehicles. Because such a vehicle often is operated in potentially dangerous conditions and must be carefully maneuvered around close obstacles, it is necessary that the cab be provided with multiple windows of extensive area in order to permit the operator to easily view the surrounding conditions on all sides of the cab.

As a result of heat transfer through the extensive window area, difficulty is encountered in comfortably heating or cooling the cab during extreme weather conditions. This problem could be alleviated by utilizing thermal insulated windows of the type comprising multiple glass panels separated by spacer means and suitably sealed to establish a dead air space between the panels. Insulated glass window assemblies, however, have not been used successfully in most commercially available off-the-road construction vehicles because the window assemblies are subjected to the high shock loads and severe vibrations which occur during operation of the vehicle. With a conventional insulated window assembly, the vibrations and shock loads acting on the window assembly destroy the integrity of the seal between the panels in a relatively short period of time. Once the seal has been ruptured, water vapor may enter and condense within the space between the panels and will soon create a visibility-impeding film which cannot be easily cleaned from the window assembly.

Accordingly, while there is a need for insulated multi-panel window assemblies in off-the-road construction vehicles and the like, such vehicles typically have been equipped with single panel windows. A single panel window not only impedes efficient heating and cooling of the cab but also forms a relatively poor noise barrier. In addition, a single panel window is comparatively susceptible to breakage by rocks, tree limbs and the like encountered in the construction and farming environments and thus can present a potential injury hazard to the operator of the vehicle.

SUMMARY OF THE INVENTION

The general aim of the present invention is to provide a new and improved insulated multiple panel window assembly which, when compared with prior window assemblies of the same general type, is capable of withstanding higher shock loads and more severe vibratory forces without breakage and without failure of the seal around the air space between the panels of the assembly.

A further object of the invention is to provide a multiple panel insulated window assembly which is so resistant to shock and vibration that the insulated window assembly may be used reliably in the cabs of heavy duty off-the-road construction and farm vehicles so as to enable the cab to be more efficiently heated and cooled, to provide better sound reduction and to better protect the operator against injury.

A more detailed object is to achieve the foregoing by providing a window assembly in which an insulated glass panel unit is supported for limited floating in a surrounding frame and is cushioned relative to the frame in such a manner as to reduce the transfer of stress from the frame to the spaced panels and the intervening seal.

Still another object of the invention is to provide a novel method of manufacturing a thermal insulated and shock resistant window of the foregoing type, the method being particularly characterized by the injection between the glass unit and the frame of a flowable material which subsequently cures to yieldably support the glass unit for limited floating relative to the frame.

These and other objects and advantages of the invention will become more apparent from the following detailed description when taken in conjunction with the accompanying drawings.

BRIEF DESCRIPTION OF THE DRAWINGS

FIG. 1. is a perspective view of a typical off-the-road vehicle equipped with new and improved window assemblies the unique features of the present invention.

FIG. 2 is an enlarged fragmentary side elevational view of one the window assemblies of the vehicle shown in 1.

FIG. 3 is an enlarged fragmentary cross-section taken substantially along the line 3–3 of FIG. 2 and schematically shows one method of injecting the flowable material between the glass unit and the frame of the window assembly.

FIG. 4 is an exploded view of certain parts shown in FIG. 3.

FIG. 5 is a perspective view of a portion of the outer frame of the window assembly.

DETAILED DESCRIPTION OF THE PREFERRED EMBODIMENT

For purposes of illustration, the present invention is shown in the drawings in connection with a large off-the-road construction vehicle such as a crawler-type tractor 10. The tractor has been shown as carrying a dozer blade 11 at its front end and a ripping implement 12 at its rear end.

As is conventional, the operator's cab 13 of the vehicle 10 includes several glass windows 15 which are comparatively large in area and which are located in all four upright wall panels of the cab so as to enable the operator to see out of the cab in all four directions. While the several windows enhance operator visibility, heat transfer through the relatively large glass areas makes it difficult to efficiently heat the cab during extremely cold weather and to efficiently cool the cab during extremely hot weather.

The present invention contemplates the provision of an improved multiple panel insulated window assembly 16 (FIGS. 2 to 4) which is particularly characterized by its ability to withstand high shock loads and severe vibrations without breakage and without loss of the integrity of the critical seal between the panels of the assembly. As a result, the insulated window assembly of the invention may be used reliably and may experience a long service life in a high shock environment such as the cab 13 of the off-the-road vehicle 10 and, when so used, increases the heating and cooling efficiency of the cab and provides better sound insulation than is the case with the single panel windows which have been widely used in the past in such heavy duty vehicles.

More specifically, the window assembly 16 of the invention includes an insulated glass unit 17 (FIG. 3) which is formed by a plurality of laterally spaced panels 18, there being two such panels in the present window assembly. Each panel preferably but not necessarily is formed by two panes of laminated safety glass and by a plastic film such as polyvinyl butyral. The plastic film is sandwiched between the two glass panes and is bonded to the glass under heat and pressure to produce a solid transparent panel while reducing sound transmission through the panel.

The two panels 18 of the insulated glass unit 17 are similar in size and shape and are disposed in laterally spaced side-by-side relation so that a space 20 (FIG. 3) is defined between the panels. In order to keep the panels separated, spacer means are sandwiched between the opposing inboard faces of the panels and extend around the panels adjacent the peripheral margins of the opposing faces of the panels. Herein, the spacer means comprise a series of laser-welded rectangular tubular air spacers, one of which is designated by the reference numeral 22 in FIGS. 3 and 4. The spacers 22 preferably are made of aluminum and are disposed end-to-end to define a spacer frame 25 having the same general peripheral configuration as the outer perimeter of the panels 18. At their abutting ends, the various spacers 22 are locked together by corner keys (not shown). Reference may be made to Miller U.S. Pat. No. 4,520,602 for a more detailed disclosure of laser-welded rectangular air spacers and corner keys which are suitable for use in the insulated glass unit 17 of the present invention. The preferred corner keys are nylon and are of the type designated as Flex Nylock corner keys by Allmetal, Inc.

To establish a primary vapor seal between the glass panels 18 and the spacer frame 25, a primary sealant 26 (FIG. 3) such as polyisolbutylene is applied between each laterally facing side of the spacer frame and the adjacent panel. This may be achieved by coating the outboard sides of the spacer frame with sealant, by placing the spacer frame between the panels, by applying sealant to all seams and by clamping and then heating the assembly. The bond thus formed establishes an air-tight seal between the panels 18 and the spacer frame 25 so as to prevent water vapor or ambient air with its attendant moisture from entering the space 20 and creating a film on the inboard faces of the panels.

To insure against the presence of moisture in the space 20, the interior of one or more of the spacers 22 is filled with a suitable dessicant 27 for attracting and retaining moisture from within the space. The welded seam 28 of each spacer is located on the inner side thereof and is left with longitudinally spaced voids to enable air to circulate between the space 20 and the dessicant in the interior of the hollow spacer frame 25.

As shown in FIG. 3, the outer side of the spacer frame 25 is spaced inwardly from the outer edges of the panels 18 by a distance of about $\frac{1}{4}$". As a result, the outer side of the spacer frame 25 coacts with the peripheral margins of the inboard faces of the panels 18 to define a groove 30 around the periphery of the insulated glass unit 17. The groove is caulked with a resiliently yieldable elastomeric material 32 which forms a secondary seal for the air space 20 and which coacts with the primary sealant 26 to bond the glass panels to the metal spacer frame and thereby hold the panels and the spacer frame together as a unitary assembly.

In carrying out the invention, the insulated glass unit 17 as described above is supported for limited floating within an outer frame 35 by a resiliently yieldable elastomeric filler 36 (FIG. 3) which preferably is molded in place between the glass unit and the frame and which cushions the glass unit from shock and vibration imparted to the frame by the vehicle 10. Because the glass unit 17 is suspended within and is cushioned from the outer frame 35 by the filler 36, the panels 18 are less susceptible to breakage and the critical seal between the panels and the spacer frame 25 is less susceptible to rupture when heavy shock loads are imposed on the window assembly 16.

In the present instance, the outer frame 35 is an aluminum extrusion and is generally U-shaped in cross-section. Thus, the outer frame 35 includes a laterally extending outer plate 38 whose inner side or face is spaced outwardly from and is disposed in opposing relation with the outer edges of both panels 18 of the glass unit 17. The spacing between the plate 38 and the edges of the panels herein is approximately $\frac{1}{4}$".

Formed integrally with and extending inward the side margins of the outer plate 38 are two side plates 40 whose inboard sides or faces are spaced laterally from and are disposed in opposing relation with the outboard faces of the panels 18 adjacent the peripheral margins thereof. Each side plate 40 is spaced laterally from its adjacent panel 18 by about $\frac{1}{8}$" and is dimensioned such that its free edge is spaced about 1-1/16" from the outer edge of the panel.

A resiliently yieldable gasket 42 (FIG. 4) is sandwiched snugly between the marginal portion of the outboard face of each panel 18 and the adjacent side plate 40 of the outer frame 35. The gaskets hold the glass unit 17 in a laterally centered position in the frame prior to final assembly. Fins 44 on the inner ends of the gasket extend laterally across and seal against the free inner edges of the side plates 40 (see FIG. 3).

To enable the glass unit 17 to be fitted within and assembled to the outer frame 35, the latter is made in at least two pieces which are separated from one another, for example, along the horizontal center line of the frame. Assembly of the glass unit 17 and the frame 35 may be effected by fixturing one of the outer frame pieces in a given position, by inserting the glass unit into that frame piece, by placing the other outer frame piece onto the glass unit and by clamping the latter frame piece in a fixed position. The gaskets 42 then are forced between the panels 18 and the side plates 40 of the frame 35 to center the glass unit laterally within the frame.

With the glass unit 17 thus fixtured in a predetermined position in the outer frame 35, the filler 36 for cushioning the glass unit within the frame is injected into the space between the glass unit and the frame and is molded in place. In this specific instance, the particular resiliently yieldable elastomeric material which is used as the filler is a silicone rubber material sold by Dow Corning Corporation under the trade designator RTV Silicone Rubber. That same silicone rubber also forms the material 32 which is caulked into the groove 30 to form the secondary seal. Prior to curing, the silicone rubber is flowable and has about the same consistency as toothpaste.

To enable the silicone rubber 36 to be injected into the space between the glass unit 17 and the outer frame 35, holes 46 (FIGS. 4 and 5) are formed through the outer plate 38 of the frame along one side thereof and are spaced from one another along the plate by a distance of about 3". Injection of the silicone rubber is effected by inserting the nozzle of an injection gun 50 into one of the holes and by pressurizing the gun to a pressure of about 35 psi. by means of a compress air source controlled by a valve 51. When the gun is pressurized, the silicone rubber is shot into and completely fills the U-shaped space between the glass unit 17 and the outer frame 35. The fins 44 of the gaskets 42 seal the inner side of such space and prevent the silicone rubber from spilling out of the inner side of the frame 35.

When the silicone rubber 36 starts weeping out of the hole 46 next to the hole with the injection gun 50, the latter is withdrawn from the first hole and is inserted into the next hole to shoot additional material into the space between the glass unit 17 and the outer frame 35. This process is continued hole-by-hole around the entire frame 35 so that the U-shaped space not only is completely filled in cross-section but also is completely filled around the entire perimeter of the window assembly 16. As the silicone rubber which defines the filler or cushion 36 flows into the space, it marries with and bonds to the sealant 32 in the groove 30. By injecting the silicone rubber into successive holes rather than a single hole, the use of high injection pressures which might distort the frame 35 or the gaskets 42 may be avoided.

The silicone rubber filler 36 may be cured at room temperature and, when cured, forms a tough but rubbery support between the glass unit 17 and the outer frame 35. As a result, the filler 36 holds the glass unit in spaced relation from and out of contact with the outer and side plates 38 and 40 of the frame and, at the same time, forms a resiliently yieldable cushion between the glass unit and the frame while allowing the glass unit to float both laterally and edgewise through a limited distance relative to the frame. Accordingly, shock loads and vibratory forces imposed on the frame are less likely to cause breakage of the panels 18 or to rupture the seal between the panels.

The window assembly 16 is completed by a mounting flange 54 which is formed integrally with and extends outwardly from the outer plate 38 of the frame at right angles to the plate and preferably but not necessarily from the center thereof. The mounting flange is adapted to be inserted into an inwardly opening groove 55 formed around the inner side of a conventional rubber fitting 56. The latter extends around the window opening of the wall 57 (FIG. 3) of the cab 13 and is formed with an outwardly opening groove 58 which receives and resiliently grips the wall 57. After the mounting flange 54 of the window assembly 16 has been inserted into the groove 55, a hinged lock 60 at the outer end portion of the fitting 56 is swung from the released position of FIG. 4 to the clamped position of FIG. 3 to cause the sides of the groove 55 to grip the mounting flange and hold the window assembly in an installed position in the window opening. Various types of fittings may be used in place of the fitting 56 which has been specifically illustrated.

From the foregoing, it will be apparent that the present invention brings to the art a new and improved window assembly 16 in which the molded-in-place elastomeric filler 36 effectively isolates the glass unit 17 from the frame 35. Thus, a multiple panel insulated glass unit may be used reliably in the off-the-road road vehicle 10 to improve heating and air conditioning efficiency, to effect better sound reduction and to reduce the risk of operator injury possibly resulting from glass breakage.

I claim:

1. A thermal insulated and shock resistant window assembly for an off-the-road vehicle, said window assembly comprising, in combination, an insulated glass unit having a pair of similarly sized and shaped flat glass panels disposed in laterally spaced face-to-face relation, spacer means sandwiched between the opposing inboard faces of the panels and extending around the panels adjacent the peripheral margins of the opposing faces of the panels, means for sealing said spacer means to said panels to form a sealed air space between said panels, an outer frame of substantially U-shaped cross-section extending around the outer periphery of said insulated glass unit, said frame comprising a laterally extending outer plate having an inner face spaced outwardly from the outer side of said spacer means and spaced outwardly from and disposed in opposing relation with the outer edges of both of said panels, said frame further comprising a pair of laterally spaced side plates integrally joined to and extending inwardly from said outer plate and having inboard faces spaced from and disposed in opposing relation with the outboard faces of said panels addjacent the peripheral margins thereof, a cushion of resiliently yieldable elastomeric material of substantially U-shaped cross-section interposed within and substantially filling the spaces between said insulated glass unit and the outer and side plates of said frame to keep the glass unit spaced from such plates while permitting limited edgewise and lateral floating of the glass unit within the frame when said window assembly is subjected to shock and vibration, hole means formed through said frame and defining injection port means permitting injection of said material into said spaces, and a sealing gasket located between the outboard face of each panel and the inboard face of the opposing side plate adjacent the free edge portion of each side plate, said gaskets confining said material in said spaces and preventing said material from flowing out of said frame past the free edges of said side plates when said material is injected through said hole means.

2. A window assembly as defined in claim 1 in which said hole means are defined by a plurality of holes formed through and spaced along said outer plate of said frame.

3. A window assembly as defined in claim 1 in which each of said gaskets includes a fin extending laterally across the free edge of the respective side plate.

4. A method of making a thermal insulated and shock resistant window assembly, said method comprising the steps of, forming an insulated glass unit by positioning spacer means between the opposing peripheral margins of a pair of glass panels and by sealing the panels to the spacer means, positioning a frame of substantially U-shaped cross-section around the outer periphery of said glass unit with the inner side of the frame located in outwardly spaced opposing relation with the edges of said panels and the outer side of said spacer means and in outwardly spaced relation with the outboard faces of said panels adjacent the peripheral margins thereof, thereafter injecting a flowable elastomeric material through said frame and into the space between the outer periphery of said glass unit and the inner side of said frame and substantially filling said space with said material, and allowing said elastomeric material to cure to a resiliently yieldable state whereby said glass unit is supported for limited edgewise floating relative to said frame when said window assembly is subjected to shock and vibration.

5. A method as defined in claim 4 in which said flowable elastomeric material is injected through said frame and into said space at multiple points spaced along said frame to insure substantially complete filling of said space.

6. A method as defined in claim 4 further including the step of inserting a sealing gasket between the outboard face of each panel and the opposing inner side of said frame adjacent each edge portion of said frame prior to injecting said flowable elastomeric material through said frame, said gaskets confining said material in said space and preventing said material from flowing out of said frame past the edges thereof.

* * * * *